US009420241B2

(12) United States Patent
Vlutters et al.

(10) Patent No.: US 9,420,241 B2
(45) Date of Patent: Aug. 16, 2016

(54) MULTI-SPECTRAL IMAGING

(75) Inventors: Ruud Vlutters, Eindhoven (NL); Remco Theodorus Johannes Muijs, Eindhoven (NL); Harold Agnes Wilhelmus Schmeitz, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 532 days.

(21) Appl. No.: 13/388,881

(22) PCT Filed: Aug. 10, 2010

(86) PCT No.: PCT/IB2010/053602
§ 371 (c)(1),
(2), (4) Date: Feb. 3, 2012

(87) PCT Pub. No.: WO2011/018749
PCT Pub. Date: Feb. 17, 2011

(65) Prior Publication Data
US 2012/0127351 A1    May 24, 2012

(30) Foreign Application Priority Data
Aug. 11, 2009    (EP) ..................... 09167624

(51) Int. Cl.
*H04N 9/07* (2006.01)
*H04N 9/04* (2006.01)
(Continued)

(52) U.S. Cl.
CPC . *H04N 9/045* (2013.01); *G01J 3/02* (2013.01); *G01J 3/0208* (2013.01); *G01J 3/0229* (2013.01); *G01J 3/2803* (2013.01); *H04N 9/097* (2013.01)

(58) Field of Classification Search
CPC ............ G02B 27/2214; G02B 3/0062; G02B 3/0006; H01L 27/14627; H01L 27/14625; H01L 27/14621; H01L 31/0232; H01L 27/14643; H04N 5/23212; H04N 13/0404; H04N 5/238; H04N 13/0406; H04N 5/2258; H04N 13/0228

USPC ........... 348/294, 302, 340, 342; 356/326, 328
See application file for complete search history.

(56) References Cited

U.S. PATENT DOCUMENTS

2003/0231880 A1* 12/2003 Irving .................... G03B 17/00
                                                              396/322
2006/0072109 A1*  4/2006 Bodkin et al. ................ 356/328
(Continued)

FOREIGN PATENT DOCUMENTS

CN          1375691 A    10/2002
JP      2007163448 A     6/2007
(Continued)

OTHER PUBLICATIONS

Ankit Mohan et al, "Agile Spectrum Imaging: Programmable Wavelength Modulation for Cameras and Projectors", Eurographics, vol. 27, No. 2, 2008.
(Continued)

*Primary Examiner* — Twyler Haskins
*Assistant Examiner* — Carramah J Quiett

(57) ABSTRACT

A multi-spectral camera comprises a blocking element (201) having at least one hole (203) allowing light to pass through. A dispersive element (205) spreads light from the at least one hole (203) in different wavelength dependent directions and a lens (207) focuses light from the dispersive element (205) on an image plane (209). A microlens array (211) receives light from the lens (207) and an image sensor (213) receives the light from the microlens array (211) and generates a pixel value signal which comprises incident light values for the pixels of the image sensor (213). A processor then generates a multi-spectral image from the pixel value signal. The approach may allow a single instantaneous sensor measurement to provide a multi-spectral image comprising at least one spatial dimension and one spectral dimension. The multi-spectral image may be generated by post-processing of the sensor output and no physical filtering or moving parts are necessary.

15 Claims, 7 Drawing Sheets

(51) Int. Cl.
*G01J 3/02* (2006.01)
*G01J 3/28* (2006.01)
*H04N 9/097* (2006.01)

(56) References Cited

U.S. PATENT DOCUMENTS

2006/0278948 A1* 12/2006 Yamaguchi ......... H01L 27/1462
257/444
2008/0193026 A1 8/2008 Horie et al.

FOREIGN PATENT DOCUMENTS

| JP | 2008527393 A | 7/2008 |
|---|---|---|
| WO | 2006078687 A2 | 7/2006 |
| WO | 2008012812 A2 | 1/2008 |

OTHER PUBLICATIONS

Ashok Veeraraghavan et al., "Dappled Photography: Mask Enhanced Cameras for Heterodyned Light Fields and Coded Aperture Refocusing".
Andrew Lumsdaine et al., "The Focused Plenoptic Camera", International Conference on Computational Photography, Apr. 2009.
Elli Angelopoulou et al., "Understanding the color of human skin", Computer Science Dept., Stevens Institute of Technology, GRAS Lab., Univ. of PA.
Billmeyer et al: "Priciples of Color Technology", John Wiley & Sons Inc.; 2nd Edition, 1981, Chapter 1, p. 14.
Ng et al: "Light Field Photography With a Hand-Held Plenoptic Camera"; Stanford Technical Report, CTSR, Feb. 2005, pp. 1-11.
Quest Innovations: Multispectral Imaging Systems, Advertisement, Downloaded From www.quest-innovations.com, Apr. 2008.

* cited by examiner

MULTI-SPECTRAL IMAGING

FIELD OF THE INVENTION

The invention relates to multi-spectral imaging and in particular, but not exclusively, to generation of multi-spectral images comprising two spatial and one spectral dimension.

BACKGROUND OF THE INVENTION

The human eye features three types of cones that are sensitive to different parts of the visible spectrum. These cones are usually designated as L, M and S, referring to the wavelengths they sense (long, middle and short), which roughly correspond to red, green and blue colours. Relative spectral sensitivities of the cones are illustrated in FIG. 1 which illustrates that the cones have a fairly broadband character and correspond to an integration of the light over a wide wavelength range. Consequently, it is possible for two materials with different spectral signatures to appear to the human observer as having the same colour in certain light conditions. This phenomenon is known as metamerism. Similar to the human eye, three primary (RGB) systems employing broad colour filters have become main-stream for both displays and cameras. Displays rely on appropriate mixing of the primary colours to generate any colour within the gamut enclosed by the primaries.

It is often beneficial to characterize images on the basis of a more detailed spectral reflectivity than that provided by (relatively coarse) RGB colour coordinates. It is furthermore desired that an image is captured with local spectral information, i.e. where the spectral characteristics of different parts of the image are individually characterized. Such, imaging is known as multi-spectral imaging and is a technique which has found many practical applications, including for example:
  Contaminant Detection
  Environmental Monitoring
  Grain/Timber Grading
  Microorganism Detection (Fluorescence/Cytometry)
  Flow Cytometry
  Oximetry, etc.

For some applications it is desirable to analyse only specific portions of the visible spectrum. For example, in photoplethysmography, the heart rate of a human is derived from time-analysis of an optical recording. It is, however, well-established that the heart-rate signal is strongest for green colours (e.g., 540-560 nm) due to the spectral absorption properties of haemoglobin. As a result, a system specifically analysing the narrow spectral band of interest will provide more accurate estimates than a system employing broad-band sensors that pick up more non-specific signals of the surroundings and noise.

It is desirable for a multi-spectral camera to provide both high spatial resolution, high spectral resolution and high temporal resolution. However, these requirements tend to be contradictory and therefore a trade-off between the different requirements is often necessary.

One type of multi-spectral cameras uses an approach wherein the scene/target is scanned line by line, and orthogonal to this line, a dispersive element (such as a grating or a prism) is used to extract the spectrum of every pixel within the line. The resulting two dimensional data (with one spatial and one spectral dimension) is captured using a conventional two dimensional sensor. The full three dimensional data (two spatial dimensions and one spectral dimension) is then built up by gradually and sequentially scanning the lines in the direction perpendicular to the line.

However, such a camera tends to be relatively complex and require a mechanical movement to implement the scanning. This tends to result in increased complexity, increased cost, reduced reliability, increased power consumption and increased size and/or weight. The required scanning process also tends to be relatively slow resulting in a relatively long time to capture an image. This makes the approach less suitable e.g. for capturing moving images.

Another type of multi-spectral cameras uses a variable spectral filter which is placed in front of a normal black and white camera. By sequentially changing the filters and recording the corresponding image, the full three dimensional data can be acquired (i.e. each captured image will correspond to the light in the passband frequency interval of the filter). A major drawback of this approach is that the light-efficiency appears to be rather poor since a lot of light is blocked by the filter. Moreover, suitable filters, such as liquid crystal tunable filters and acousto-optical tunable filters, are rather expensive and usually only allow a single wavelength of light to pass through (notch pass). The approach also tends to have the same disadvantages as the scanning multi-spectral cameras, i.e. to be slow, have relatively low reliability etc.

A particularly important disadvantage with these types of multi-spectral cameras is that they trade spectral resolution for temporal resolution. This is a disadvantage in situations where the imaged objects are moving. Furthermore, the methods generally have very specific (fixed) spectral resolutions that cannot easily be adapted to the application.

Hence, an improved multi-spectral camera would be advantageous. For example, a multi-spectral camera allowing increased flexibility, reduced cost, reduced complexity, increased reliability, reduced size/weight, reduced power consumption, improved temporal performance/resolution and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a multi-spectral camera comprising: a light blocking element having at least one hole allowing light to pass through; a dispersive element for spreading light from the at least one hole in different wavelength dependent directions; a lens for focusing light from the dispersive element on an image plane; a microlens array receiving light from the lens; an image sensor receiving light from the micro lens array and generating a pixel value signal comprising incident light values for pixels of the image sensor; and a processor for generating a multi-spectral image from the pixel value signal.

The invention may provide an improved spectral camera. In particular, the approach may allow a multi-spectral image to be captured without requiring sequential operations such as scanning or a sequential change of physical filters. The capturing of image information allowing the multi-spectral image to be generated may in many embodiments be substantially instantaneous. The approach may provide an improved temporal performance and may in particular allow a high temporal resolution while maintaining a relatively high spatial and spectral resolution. The multi-spectral camera of the invention may be particularly suitable for e.g. capture of moving objects or video images.

The approach may further allow a fixed mechanical setup and may reduce cost, size/weight, power consumption and/or complexity. It may also provide increased reliability.

For example, in some embodiments a multi-spectral camera using the approach may be able to instantaneously capture a spectrum for every pixel in a scene. In contrast to conventional cameras, such as line-scanning spectrometers or variable blocking filter cameras, local spectral information for all pixels may be captured simultaneously thereby providing improved temporal performance, which is highly beneficial e.g. in the presence of motion.

The system can use data from a conventional image sensor in combination with a dedicated configuration of a main lens, a micro-lens array and a dispersive element, such as a grating or prism, to generate a detailed multi-spectral image. The approach may post-process the signal from the image sensor to generate a multi-spectral image with the desired requirements. For example, the approach may allow colour filters to be designed and applied in software as a numerical post-processing step thereby providing increased flexibility.

A multi-spectral image has both spatial and spectral content. Typically, data is represented in three dimensional data sets corresponding to two spatial dimensions and one spectral dimension. For example, the spectral distribution for a plurality of areas of the image may be represented by the multi-spectral image. Thus, the multi-spectral image is a combined spatial and spectral image. In some embodiments, the multi-spectral image may be divided into a plurality of pixels with a spectral distribution being provided for each pixel. A multi-spectral image comprises individual spectral data for a plurality of areas within the image. Thus, a multi-spectral image comprises localised spectral data and specifically can provide both information of a visible image and the spectral variations for the image.

The light blocking element may form an enclosure for the camera such that the only light reaching the dispersive element, the lens, the microlens and the image sensor is that passing through a hole in the light blocking element.

The construction of the multi-spectral camera may use a structure of sequential planes with the blocking element forming a first light blocking plane (apart from the holes), followed by a (possibly parallel) plane for the dispersive element, followed by a plane of the lens, followed by a (possibly parallel) plane of the microlens array, followed by the image sensor (which may possibly by parallel to the microlens array). The image plane may be a (virtual) (possibly parallel) plane, typically between the lens and the micro lens array. The lens, microlens and sensor planes may specifically be arranged in a Scheimpflug configuration. This may for example accommodate for embodiments wherein the dispersive element introduces an angle to the optical axis.

The dispersive element may e.g. be a prism or a grating element and may provide the spreading by diffraction.

The at least one hole may be any suitable hole in the light blocking element that allows light to pass through the light blocking element. The hole need not be empty but may for example be filled with a transparent material. In some embodiments, a lens and/or diaphragm may be located in the at least one hole. Thus, from an optical point of view the at least one hole may be at least one lens and/or diaphragm. Specifically, the at least one hole may comprise the aperture of an object lens that images onto the dispersive element.

In accordance with an optional feature of the invention, the multi-spectral image comprises a spectral distribution indication for pixels of the multi-spectral image.

The invention may allow improved generation of multi-spectral images with a relatively high spatial, spectral, and/or temporal resolution.

In accordance with an optional feature of the invention, the processor is arranged to: synthesize a first image at a rainbow plane from the pixel value signal; generating a second image by applying a spatial mask to the first image, the spatial mask corresponding to a spectral characteristic; and generating a spatial image for the multi-spectral image corresponding to the spectral characteristic from the second image.

This may provide improved performance and/or facilitated operation. In particular, it may allow spectral characteristics to be determined that meet the specific desires and requirements for the individual embodiment. The spectral characteristics may e.g. be determined by computational processing without requiring any manual, mechanical or physical changes. Thus, the characteristics of the generated multi-spectral image may be changed simply by adapting the processing of the sensor output. Thus, a more flexible approach is achieved which is not limited by physical restrictions of e.g. spectral or spatial filters.

The rainbow plane is specifically a plane where the position of light is only dependent on the wavelength of the light. Thus, light of all parts of the scene (i.e. passing through the at least one hole at any angle) will converge on the same point which is dependent on the wavelength. Thus, at the rainbow plane the spectral characteristics are fully converted to spatial characteristics.

The first image is not a spatial image of the scene but rather is a spectral image where each point corresponds to the accumulated light intensity of the scene for one wavelength. Thus, the first image may be considered a spectral image or spectral map. Specifically, the first image may be considered to be a spectral intensity map.

In accordance with an optional feature of the invention, the processor is arranged to: determine a plurality of spatial images corresponding to different spectral characteristics by applying corresponding different spatial masks to the first image; and generate the multi-spectral image from the plurality of spatial images.

This may provide a practical and flexible approach for generating a multi-spectral image. A succession of masks corresponding to different spectral characteristics/filters may be applied in parallel or sequentially by a post-processing algorithm to provide a set of spatial images corresponding to different spectral footprints/characteristics. The spectral footprints/characteristics can be flexibly selected and applied by a low complexity spatial processing.

In accordance with an optional feature of the invention, the spectral characteristic corresponds to a bandpass filter.

The band-pass filter characteristic may specifically correspond to a selection of a frequency interval. This may allow a practical and efficient generation of multi-spectral images.

In accordance with an optional feature of the invention, the micro lens array and image sensor are arranged such that light passing through the at least one hole at an identical angle is distributed across a plurality of pixels of the image sensor, the distribution being a wavelength dependent distribution.

This may provide an improved and/or facilitated generation of multi-spectral images. The distribution may specifically be such that a single light ray at a given angle through the at least one hole may reach a plurality of pixels with a different wavelength interval reaching each pixel.

In accordance with an optional feature of the invention, the processor is arranged to compensate for a single pixel value of the image sensor receiving light rays corresponding to rays with different wavelengths and passing through the at least one hole at different angles.

This may provide an improved and/or facilitated generation of multi-spectral images. Alternatively or additionally, the approach may facilitate implementation.

In accordance with an optional feature of the invention, the micro lens array is substantially located at the image plane.

This may be particularly advantageous in some embodiments or scenarios. In particular, it may in many scenarios allow a multi-spectral image to be generated directly from the sensor output without requiring filtering post-processing. The approach may for example provide increased spectral resolution.

In accordance with an optional feature of the invention, the microlens array is located between the image plane and the image sensor.

This may be particularly advantageous in some embodiments or scenarios. In particular, it may allow the image sensor to capture information that is highly suitable for generating the multi-spectral image by computational post-processing.

In accordance with an optional feature of the invention, the multi-spectral camera further comprises a user input and a controller for adjusting a position of at least one of the microlens array and the image sensor in response to the user input.

This may allow a more flexible multi-spectral camera and may in particular allow a user to control a trade-off between spatial and spectral resolution for the image captured by the image sensor.

In accordance with an optional feature of the invention, the light blocking element provides a light blocking plane and the at least one hole is a slit in the light blocking plane.

The approach may allow a three dimensional image with two spatial and one spectral dimension to be captured from a single sensor measurement. The slit may typically have a width of 1 mm or less. Furthermore, a narrow slit may ensure that the angles of incident rays on the at least one hole are well controlled in one dimension while allowing an extended scene to be captured. The dispersive element may e.g. be a line grating element with lines substantially parallel to the slit. The microlens array may specifically be a lenticular array with lines substantially parallel to the slit.

In accordance with an optional feature of the invention, the image sensor is a two-dimensional image sensor.

This may allow a three dimensional image with two spatial and one spectral dimension to be captured from a single sensor measurement.

In accordance with an optional feature of the invention, the at least one hole comprises a plurality of holes forming a coded aperture.

This may increase the light sensitivity of the multi-spectral camera while still allowing efficient generation of a multi-spectral image by post-processing. The coded aperture may particularly provide incident light from the plurality of holes while allowing this to be compensated by the post processing. The coded aperture may e.g. comprise substantially circular holes or elongated slits arranged in a suitable configuration which can be compensated/inverted by post-processing.

In accordance with an optional feature of the invention, the at least one hole comprises a pinhole.

This may allow angles of incident rays on the at least one hole to be well controlled with well defined angles depending on the direction to the source of the rays. Advantageously, the pinhole may often have a maximum dimension of 1 mm or less.

According to an aspect of the invention there is provided a method of generating a multi-spectral image, the method comprising: providing a light blocking element having at least one hole allowing light to pass through; providing a dispersive element for spreading light from the at least one hole in different wavelength dependent directions; providing a lens for focusing light from the dispersive element on an image plane; providing a microlens array receiving light from the lens; providing a image sensor for receiving light from the micro lens array and generating a pixel value signal comprising incident light values for pixels of the image sensor; and generating a multi-spectral image from the pixel value signal.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
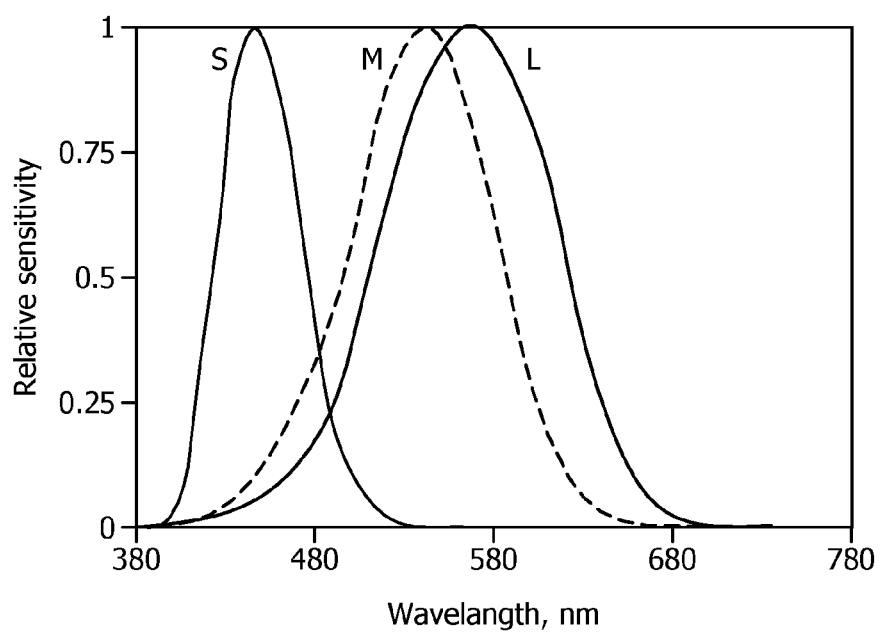
FIG. 1 is an illustration of relative spectral sensitivities of the human eye.
Figure 2:
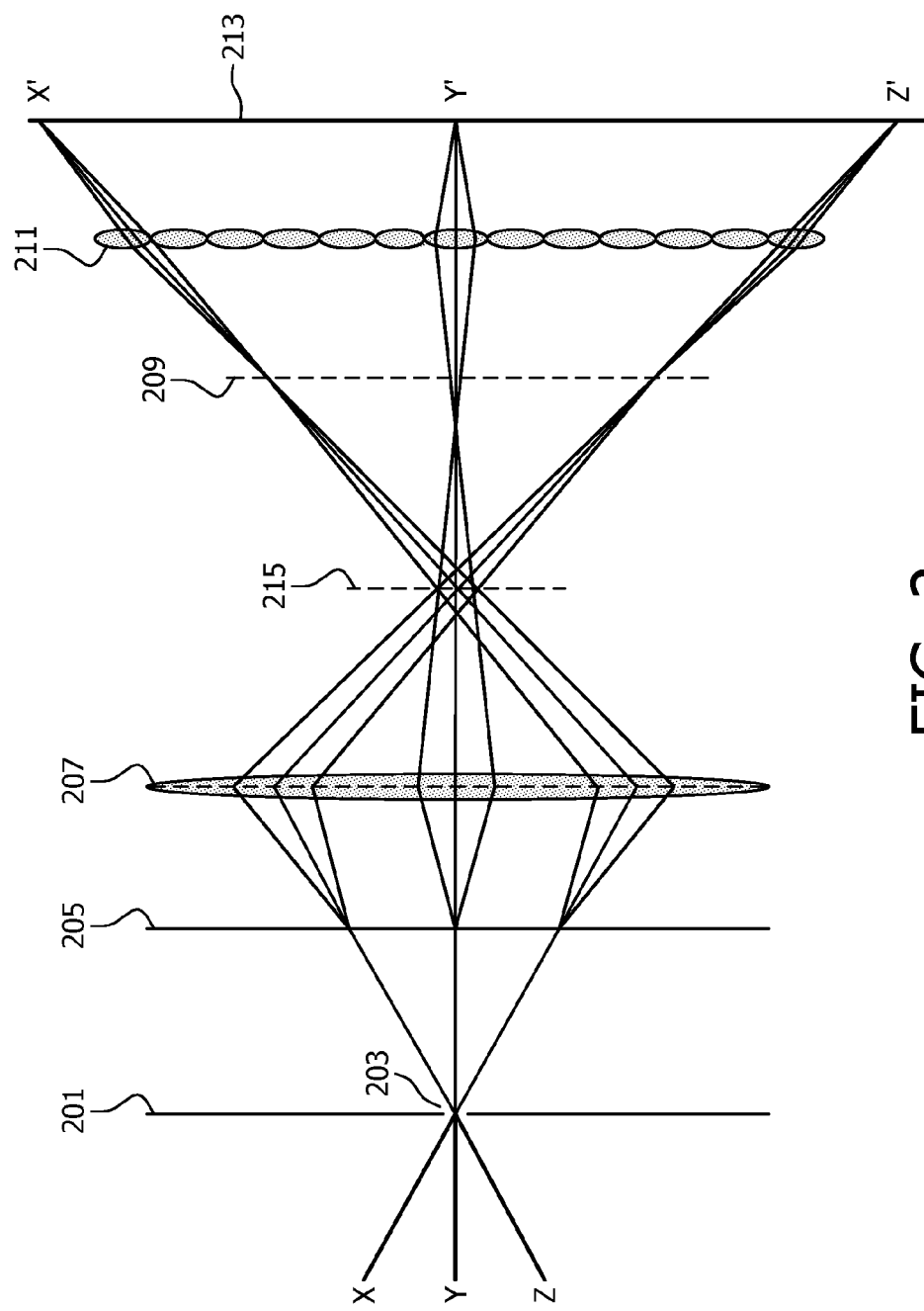
FIG. 2 is an illustration of some elements of a multi-spectral camera in accordance with some embodiments of the invention.

FIG. 2 illustrates an example of elements of a multi-spectral camera in accordance with some embodiments of the invention.

The multi-spectral camera comprise a light blocking element 201 which comprises one or more holes 203 that allow light to pass through. For clarity, the following description will focus on an example wherein a pinhole (or a narrow slit) is provided in the light blocking element 201 but it will be appreciated that in other embodiments, more than one hole may be included.

In the example, the hole 203 has a maximum dimension of less than 1 mm (or for a slit, a width of less than 1 mm). Specifically, the hole 203 is so small that the direction/angle of the light rays from the objects being imaged do not vary more than e.g. 1° across the hole, i.e. rays that originate from the same position can only pass through the hole 203 if they have an angle relative to the hole which is within 1° of each other. In the specific example, the multi-spectral camera is used for imaging of objects that are at least 20 cm from the hole 203 and thus the hole is sufficiently small for the angle/direction of the rays from the same spatial point that pass through the hole 203 to be no more than 1°.

The multi-spectral camera further comprises a dispersive element 205 which receives the light passing through the hole 203. In the example, the dispersive element 205 forms a dispersive plane. The dispersive element 205 spreads the light from the hole 203 in different wavelength dependent directions. Thus, a ray of light may originate from an object in the scene and reach the distribution server 109 through the hole 203. Due to the small dimensions of the hole 203, the direction/angle at which the ray reaches the hole depends only on the direction from the object to the hole 203 (the hole 203 is assumed to have infinitesimal size). The dispersive element 205 then spreads the light of the ray into an angular distribution where the angle of exit from the dispersive element 205 depends on the wavelength.

It should be noted that the size of the hole directly determines the spectral resolution that can be obtained. The angle range impinging on the same position on the dispersive element 205 is given as the pinhole size divided by the distance between the hole 203 and the dispersive element 205. This controls the directions of the different rays following dispersion and thus the spectral resolution at e.g. the rainbow plane.

In some embodiments, the dispersive element 205 may e.g. be a prism. In the example of FIG. 2, the dispersive element 205 is a grating element which spreads the incident light due to diffraction effects. Thus, in the example, light from the scene (objects X, Y, Z) propagate through a pinhole 203 and then falls on a grating (provided by the dispersive element 205). Due to the diffractive action from the grating, different wavelengths are dispersed into different propagation directions.

Depending on the desired field of view, the distance between the hole 203 and the dispersive element 205 may often advantageously be in the interval between 10 and 100 mm (both values included).

The multi-spectral camera further comprises a lens 207 which receives the light from the dispersive element 205 and which focuses this on an image plane 209. The focussing is such that all light passing through the hole 203 at a given angle reach the same point on the image plane 209. Thus, the lens complements/reverses the operation/effect of the dispersive element 205 when measured at the image plane 209. Thus, the spreading of a ray by the dispersive element 205 is exactly compensated by the lens 207 for the image plane 209 such that the single ray is converged to a single point on the image plane 209. Thus, the incident light on the image plane 209 corresponds to the incident light on the dispersive element 205 except for a reversal (i.e. the image is "upside down").

It should be noted that the image plane 209 is not a physical element but rather references the plane where the spectral spreading of the incoming light rays is compensated. Thus, if an image sensor was located at the image plane, it would capture a spatial image but would not capture any spectral information. The image plane 209 can be considered to correspond to a virtual plane (where a focused spatial image could be captured).

The lens 207 is typically positioned to have a main axis/plane which is perpendicular to the $N^{th}$ (typically first) order diffraction of the dispersive element 205. Furthermore, the distance between the dispersive element 205 and the lens 207 will typically advantageously be larger than the distance between hole 203 and dispersive element 205.

The multi-spectral camera further comprises a microlens array 211 which receives light from the lens 207. The microlens array 211 comprises a plurality of lenses covering a plane of incident light from the lens 207. The microlens array 211 may advantageously form a plane intersecting the 'hinge line' (Scheimpflug configuration) that is also intersected by the plane of the dispersive element 205 and the main axis/plane of the lens 207. The distance between the lens 207 and the microlens array 211 may be determined from the lens formula for lens 207, thus depending on strength of lens 207 and distance from dispersive element 205.

The multi-spectral camera further comprises an image sensor 213 which comprises a number of sensor elements for detecting an incident light level. Each sensor element is thus a light sensor corresponding to a pixel of the captured image. In the example of FIG. 2, the sensor elements are arranged in a two dimensional plane.

Thus, each sensor element may correspond to a pixel of the image generated by the microlens array 211 at the plane where the image sensor 213 is located. The image sensor 213 generates a pixel value signal which comprises incident light values for the pixels of the image sensor. The pixel value signal may specifically comprise the measured values for each of the sensor elements.

The pixel value signal is fed to a processor which then determines a multi-spectral image from the signal.

The introduction of a micro lens array 211 essentially provides information that can be used to post-process the captured information in the specific camera structure such that a three dimensional (two spatial and one spectral dimension) data set corresponding to a multi-spectral image can be generated by a single instantaneous measurement. Thus, spectral information can be determined without requiring sequential physical light filtering or scanning.

The introduction of the microlens array 211 specifically allows an accurate and separate determination of spatial and spectral characteristics based on a single two-dimensional image sensor measurement.

Figure 3:
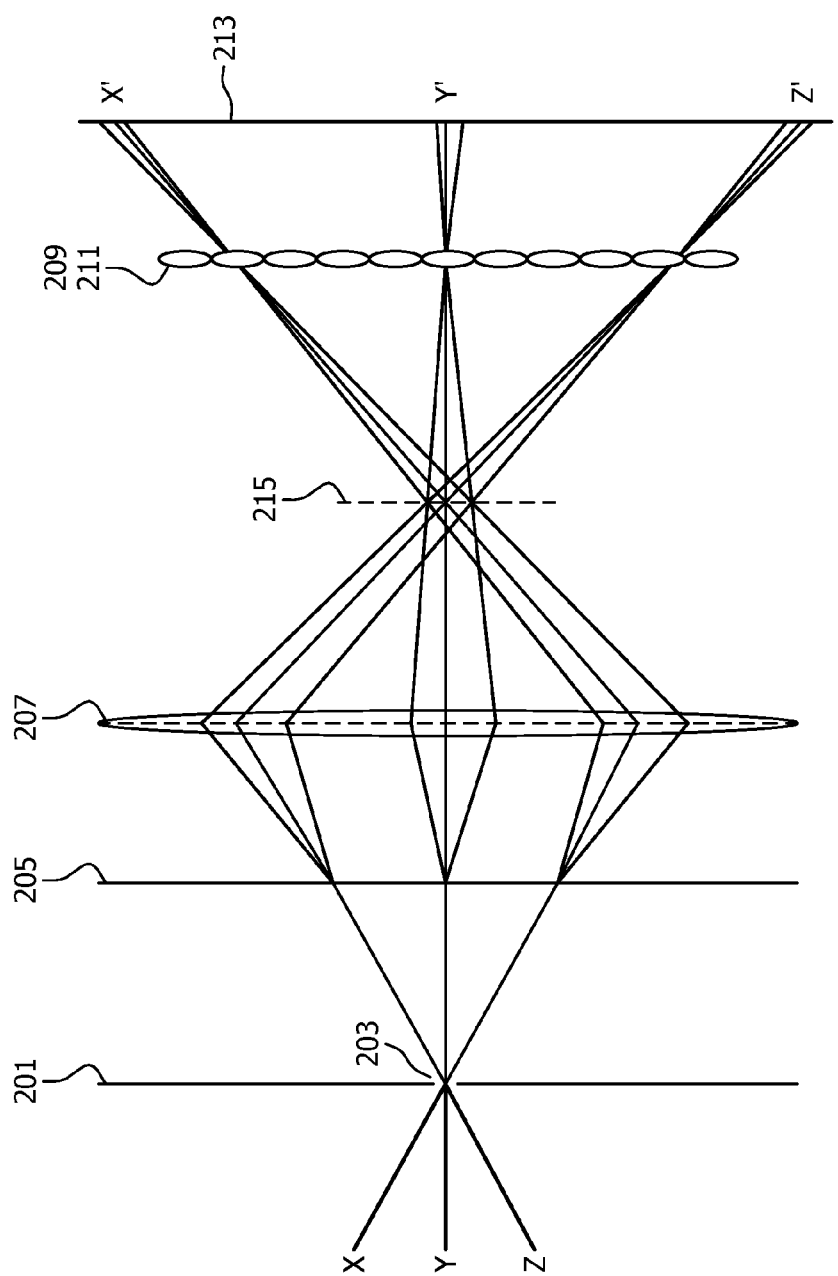
FIG. 3 is an illustration of some elements of a multi-spectral camera in accordance with some embodiments of the invention.

An example of this is illustrated in FIG. 3. In this case, the microlens array 211 is located substantially at the image plane 207. Thus, all the light that is incident on the micro lens array 211 is well focused spatially and each of the microlenses may be considered to correspond to a spatial pixel value. However, the image projected on the microlens array 211 does not have any spectral distribution, i.e. all wavelengths from the same position in the scene (and thus passing the hole 203 at the same angle) reach the same microlens. However, although the different wavelengths of a ray converge to the same point in the microlens array 211, they do this from different directions and have different incident angles. This is utilized by the microlens array 211 to spread the incident light rays depending on the incoming angle and thus the wavelength. Thus, the light exiting from a micro lens corresponds to the incident light on the micro lens (and thus to a single position) but with an angular spread that reflects the wavelength, i.e. the exiting light has a spectral (spatial) distribution.

In the example of FIG. 3, the image sensor 213 is located such that the light from one micro lens covers a plurality of pixels while at the same time the light from each micro lens reaches only one set of pixels (or conversely, there is no overlap between the light cones from the individual microlenses and each pixel (sensor element) receives light from only one microlens.

Accordingly, in the example of FIG. 3, the image sensor 213 captures light which is divided into spatial pixel groups with each pixel group corresponding to a micro lens. Furthermore, each pixel group comprises a plurality of pixels each of which corresponds to the light of a specific wavelength interval. Thus, the captured data provides multi-spectral data corresponding to a multi-spectral image with a spatial resolution corresponding to the micro lenses of the micro lens array 211 and a spectral resolution corresponding to the number of pixels in each pixel group.

As a practical example, a 1 Mpixel sensor may be used with a 100 by 100 microlens array 211 to provide a multi-spectral image with a spatial resolution of 100 by 100 pixels and a spectral resolution of 100 spectral values per spatial pixel.

Thus, the micro lens array 211 utilizes the information of the wavelength dependent angles of the incident rays to the micro lens array 211 to provide spectral information while maintaining the distinct spatial information of the image plane. Thus, simultaneous and resolvable spectral and spatial information is captured by a single sensor measurement.

It should be noted that such a measurement cannot be made without the introduction of the microlens array 211. For example, in the article Mohan, A., Raskar, R. and Tumblin, J., "Agile Spectrum Imaging: Programmable Wavelength Modulation for Cameras and Projectors", Computer Graphics Forum, vol. 27, number 2, 2008, pages 709-717 it is suggested that a multi-spectral camera can be based on a structure such as that of FIG. 4. In this system, an image sensor is located at the image plane which is the only position in the system where the position of the rays is only dependent on the spatial position of the source of the ray. Thus, in the prior art system, this plane is the only plane that allows the spatial positions to be determined.

The prior art camera performs an optical filtering of the incoming rays to generate multi-spectral images. Specifically, the prior art camera sequentially inserts different optical filters at the rainbow plane. The rainbow plane is a plane wherein the position of the light is only dependent on the wavelength of the light and is not dependent on the spatial source of the light (and thus is not dependent on the angle/direction of the rays through the hole 203). Thus, at the rainbow plane, the light rays are ordered based on their specific wavelength from top to bottom. The rainbow plane may be perceived as complementary to the image plane, i.e. at the rainbow plane the image is a spectral image with no spatial information or correlation whereas the image at the image plane is a spatial image with no spectral information.

This is used in the prior art camera to position an image sensor at the image plane and filter elements at the rainbow plane. Specifically, a series of blocking or attenuation masks are sequentially inserted at the rainbow plane, and for each mask a spatial image is captured by the image sensor. Each of these images thus correspond to the image for the spectral footprint corresponding to the mask and by using a series of masks, the images may be collated to provide the multi-spectral image.

However, such an approach tends to be suboptimal and may be considered slow, complex, and impractical for some applications. In particular, the requirement for physically changing masks at the rainbow plane is inconvenient and results in typically a relatively slow operation with low temporal resolution.

Figure 4:
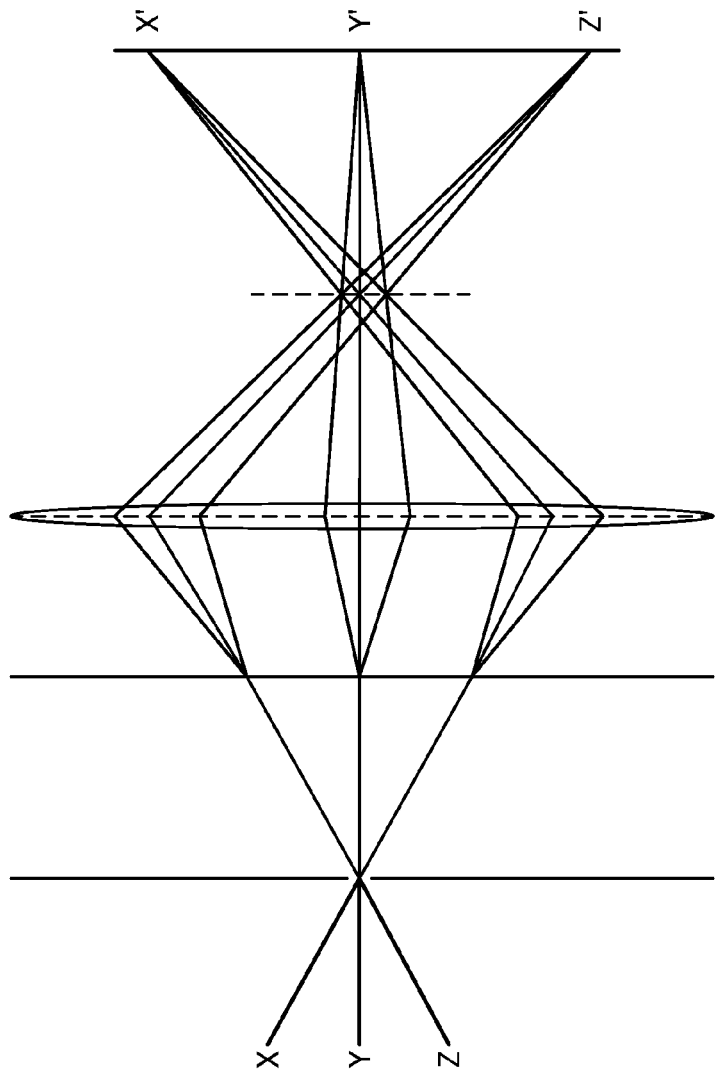
FIG. 4 is an illustration of some elements of an agile spectrum imaging system in accordance with prior art.

It should be noted that in the system of FIG. 4 the images that can be captured at any other planes will be a combination of spatial and spectral information. Thus, light reaching a specific point of a given plane (other than the rainbow or image planes) correspond to rays of different wavelengths originating from different directions. This combined information cannot be resolved by processing of image data captured by an image sensor and thus the camera requires that the image sensor is located at the image plane and that blocking masks are sequentially introduced at the rainbow plane.

However, the multi-spectral camera of FIGS. 2 and 3 uses a different approach that avoids the need for any masking filters to be introduced at the rainbow plane and which furthermore allows flexibility in the positioning of the image sensor 211.

In particular, the system uses a microlens array 211 to provide information that allows both spectral and spatial information to be extracted from a single plane and thus by a single measurement by a single image sensor. In particular, the invention is based on the insight that additional information is provided in each plane by the angle of the incident light on the plane and that this information can actively be used to separate spatial and spectral characteristics at that plane.

For example, at the image plane the position of the incoming light rays depend only on the position of the source in the scene (and specifically on the angle through the pinhole 203). However, the angle of the rays falling on a specific point depend on the wavelength due to the dispersion provided by the dispersive element 205. Therefore, in FIG. 3, a microlens array 211 inserted at the image plane can use this angular dependency to generate a spectral distribution for each microlens. The spectral distribution for each micro lens thus reflects the spectral characteristics of the exact image area corresponding to the microlens and does not include any contribution from any other positions. Thus, the micro lens array 211 ensures that the spatial separation is maintained and the sensor can accordingly measure both spectral and spatial information. Indeed, in the example, it is avoided that the sensor receives combined light from different positions with different wavelengths. Thus, the unresolvable ambiguity is avoided.

Similarly, at the rainbow plane, the position of each ray depends only on the wavelength. However, the direction/angle depends on the spatial position in the scene. Thus, a microlens array 211 at the rainbow plane could generate a spatial spectrum for the micro lens, i.e. a spatial distribution can be generated for each spectral interval corresponding to a micro lens (although this would typically be less practical and more difficult to process than the example of FIG. 3).

In some embodiments the microlens array 211 may be located at planes where each position is reached by different rays that originate from different positions but have different wavelengths that happen to compensate for the difference in position. For example, in many embodiments, the microlens array 211 may advantageously be located behind (on remote side from the lens 207) the image plane. In this case, each sensor element of the image sensor 213 may receive light that is a combination of rays of different wavelengths and from different spatial positions. However, the additional information provided by the plurality of light sensors for each microlens allows this to be resolved thereby allowing a suitable multi-spectral image to be generated. In other words, the ambiguity inherent in the position is resolved by the micro lens array 211 further revealing the information resident in the incident angle of the light.

In some embodiments, the signals from the image sensor 213 may be preprocessed to provide a multi-spectral image with high spatial resolution and a high and flexible spectral resolution. The post-processing may specifically include the synthesis of an image corresponding to that which would be captured at the rainbow plane. A spatial filtering (typically a masking or attenuation of various areas) is then applied to the rainbow image. Based on the resulting image, a spatial image is then synthesized and used as an image for the spectral footprint corresponding to the filtering applied for the rainbow plane image. By applying a set of filters/masks, images corresponding to different spectral footprints or characteristics can be generated and the multi-spectral image can be determined as the three dimensional (two spatial and one spectral dimension) image set comprising these two dimensional spatial images for different spectral footprints.

The processor may specifically iterate the following steps:
1. Synthesizing of data as it would have been recorded by a virtual sensor positioned in the rainbow plane.
2. Application of a desired numerical aperture/filter to the synthesized data.
3. Re-synthesizing of the filtered data on the physical sensor plane.

4. Rendering of a spatial image by combination (integration) of rays reaching a pixel position.

The synthesizing of the different filters may be performed by ray tracing processes. Indeed, the processing may be achieved by using similar processing as that proposed for plenoptic cameras when performing post capture focusing as e.g. explained in Lumsdaine, A., Georgiev, T., "The Focused Plenoptic Camera", International Conference on Computational Photography, April 2009.

Figure 5:
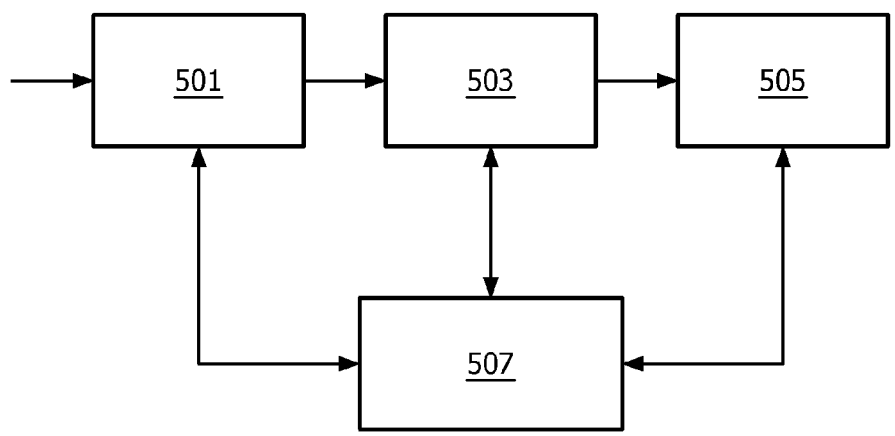
FIG. 5 is an illustration of some elements of a processing element for a multi-spectral camera in accordance with some embodiments of the invention.

FIG. 5 illustrates an example of a processor that follows this approach. The processor comprises a rainbow plane processor 501 which receives the pixel value signal from the image signal encoder. The pixel value signal comprises the light level for each light sensor, i.e. for each pixel of the image signal encoder.

The rainbow plane processor 501 then proceeds to synthesize a first image corresponding to the image that would be received at the rainbow plane by a virtual image sensor. This synthesis can be performed by a ray tracing algorithm which uses the spatial and angular information of the light incident on the image sensor 213 to calculate the image at the rainbow element. This synthesis may include consideration of rays with different wavelength reaching a light sensor from different angles and may accordingly compensate for this.

The first image is not a spatial image of the scene but rather is a spectral image where each point corresponds to the accumulated light intensity of the scene for one wavelength. Thus, the first image may be considered a spectral image or spectral map. Specifically, the first image may be considered to be a spectral intensity map.

In more detail, the rainbow plane processor 501 may synthesize the first image at the rainbow plane by tracing the rays impinging on each sensor pixel back to the rainbow plane 215, taking into account the refraction at the microlens plane.

The tracing of the rays can be done, by looking from the pixel coordinate towards the center of the corresponding micro lens, this provides us with a position and an angle. Next based on the matrix formalism for geometrical optics (Ref e.g. the textbook "Optics", by E. Hecht, ISBN 0321188780, section 6.2 Analytical Raytracing, and especially section 6.2.1 Matrix Methods), one can trace through the lens and towards the rainbow plane. Next, based on the ray's position at the rainbow plane, one can process the corresponding sensor pixel.

The synthesized image is then fed to a spatial mask processor 503 which is arranged to apply a spatial mask to the first image. The mask may for example be a binary mask or may be a continuous mask which e.g. comprises an attenuation value for each pixel of the first image. For example, a predetermined mask comprising a scaling factor for each pixel may be applied to the first image by multiplying the pixel value and the scaling factor.

Since the rainbow plane comprises a picture where each position corresponds to a specific wavelength (and which is independent of the spatial characteristics), the application of a spatial mask corresponds to a filtering in the spectral/frequency domain. Thus, by a low complexity application of a mask, any desired spectral footprint of the resulting signal can easily be generated. The approach may be used to provide a low complexity band pass filtering. For example, for a given frequency/wavelength interval, a suitable mask may be determined simply by setting the scaling factor for the pixels corresponding to these intervals to a one and all other scaling factors to zero (it will be appreciated that in most embodiments a suitable window would be applied to smooth the transitions such as e.g. a Hanning or Hamming window).

Thus, the spatial mask processor 503 generates a masked image which corresponds to a specific spectral interval. This image is fed to an image processor 505 which proceeds to synthesize a spatial image corresponding to the masked image at the rainbow plane. The spatial image may be generated by ray tracing from the data of the masked image (i.e. considering angles and light intensity of the rays). The ray tracing may for example be used to determine the image at the image plane, i.e. a purely spatial image may be generated for the specific frequency interval selected by the masking.

In more detail, the image plane processor 505 may synthesize the first image by integrating/summing the rays corresponding to each spatial image location. To create a multiband (e.g. RGB) image, a separate masking and image formation process may be performed for each spectral band. Like in a normal camera, the camera is integrating light from all different directions for every spatial location/pixel. In our case, in order to synthesize an image, we have to integrate all the rays that fall in the same output-pixel bin (taking into account that we can attribute to every sensor pixel an angle and image position in the image plane 215)

In the example of FIG. 5, the operation of the processor is controlled by a controller 507 which is coupled to the rainbow plane processor 501, the spatial mask processor 503 and the image processor 505. When the rainbow plane processor 501 receives an image from the image sensor 213, the controller 507 controls it to synthesize the image at the rainbow plane and to forward it to the spatial mask processor 503. It then proceeds to provide a first mask to the spatial mask processor 503 and instruct the spatial mask processor 503 and the image processor 505 to perform the required processing to generate a spatial image corresponding to the frequency profile represented by this first mask. When this image is received, the controller 507 stores the image and proceeds to provide a second mask to the spatial mask processor 503. This second mask corresponds to a different spectral profile than the first mask. The spatial mask processor 503 and image processor 505 are then controlled to generate a second spatial image corresponding to this second spectral profile. The process is repeated for as many masks/spectral profiles as desired for the specific application. The resulting two dimensional spatial images corresponding to different spectral profiles are then collected in a set of images to provide the multi-spectral image.

For example, the supplied masks may correspond to the spectrum being divided into a desired number of intervals and the multi-spectral image may thus have a spectral resolution corresponding to the masks and number of spatial images generated.

Thus, instead of introducing physical filters in the rainbow plane, the approach allows filters to be applied by a post-processing step involving a numerical operation. This allows a multi-spectral image to be generated based on a single instantaneous capture by an image sensor. The approach is thus suitable for e.g. imaging of moving objects.

The positioning of the microlens array 211 and image sensor 213 may be used to provide a desired trade-off between different characteristics. Indeed, different trade-offs between the spatial and spectral resolution can be obtained by positioning the micro-lens array 211 and image sensor 213 at slightly different positions. For example, in the configuration of FIG. 3, each individual light sensor/pixel samples a slightly different region of the image integrating over a somewhat wider range in wavelength. This results in a higher spatial resolution, but a lower spectral resolution than the configuration of FIG. 2 (for the same image sensor 213).

The configuration of FIG. 3 results in optimal spectral resolution determined by the number of pixels/sensor elements underneath a single micro-lens, and minimal spatial resolution determined by the number (and size) of microlenses and the magnification of the imaging system. Indeed, in the example of FIG. 3, individual pixels/sensor elements underneath a single micro-lens measure information about the same image region, but corresponding to different wavelengths. In contrast, in the example of FIG. 2, individual pixels/sensor elements underneath a single micro-lens measure information about the whole spectrum but corresponding to different image regions. For positioning of the microlens array 211 at other positions, the captured information by the pixel/sensor element set for a given microlens comprises a combination of wavelength and position information, i.e. a combination of spectral and spatial information.

As a result, the positioning of the microlens array 211 and the image sensor 213 is a trade-off between spectral and spatial resolution. In some embodiments, the multi-spectral camera may further comprise a user input which can be used to modify the position of the image sensor 213 and/or the microlens array 211 (and/or the lens 207) dependent on the user input. The user input may e.g. be a mechanical input that directly shifts the position of one of the elements or may e.g. be an electrical user input which is used to control a mechanical actuator (e.g. a step motor) which moves image sensor 213 and/or the microlens array 211. The movement may for example be relative to the image plane, the lens 207, or may e.g. correspond to a relative movement between the microlens array 211 and the image sensor 213.

Thus, the user input may be used to adapt the multi-spectral camera to the specific characteristics and preferences of the individual application.

In many applications, improved performance and/or facilitated operation is achieved for the microlens array 211 being located between the image plane 209 and the image sensor 213. Indeed, this may often provide a suitable trade-off between spectral and spatial resolution while allowing a relatively low complexity post processing to be performed. In other applications, improved performance and/or facilitated operation may be achieved for the microlens array 211 being located in front of the image plane 209 relative to the image sensor 213.

The approach may provide a highly flexible spectral imaging system, in which the colour filters may be programmable in software rather than requiring physical colour filters. This provides much more freedom in terms of filter design (e.g. having negative filter coefficients). As a result, it is possible to design colour filters with a spectral response that cannot be created using physical colour filters employing LC-layers, acousto-optics or chemical solutions.

Compared to line-scanning spectrometers, the proposed device has the additional benefit that local spectral information for all pixels in the scene is acquired instantaneously, thus overcoming complications in the presence of motion. The multi-spectral camera provides spectral information at the expense of (some) spatial resolution, but the camera can be adapted to provide the optimal balance between the two for the specific application.

FIGS. 2 and 3 provide a two-dimensional description of the multi-spectral camera and in some embodiments, the camera may provide a single spatial dimension and a spectral dimension. However, in many embodiments, the image sensor is a two dimensional sensor and the camera provides two spatial dimensions and one spectral dimension. Specifically, FIGS. 2 and 3 may be seen as cross sectional diagrams of a structure that extends perpendicularly to the plane of the figures (i.e. along the planes of the elements, the rainbow plane and the image plane). Thus, the pinhole 203 may be a narrow slit, the dispersive element 205 may e.g., be a line grating, the main lens 207 may be a normal (spherical) lens and the micro lens array 211 may be a lenticular array).

In the previous example, the blocking element 201 has been illustrated with a single hole 201. However, this tends to restrict the amount of light being captured and thus results in a low light sensitivity of the camera. In order to improve the light efficiency of the system it may be desirable to increase the aperture size (i.e. the size of the hole). However, this would result in spectral blur, because the incident light falling on the dispersive element 205 would cover a significant range of incidence angles.

Therefore, in order to improve the light sensitivity, the blocking element may comprise a plurality of holes that form a coded aperture. The coded aperture can be considered a plurality of holes with a known pattern that can be inverted. Specifically, the coded aperture may be a row of holes with a specific pattern. By choosing a pattern that is easy to invert, it is possible to increase the amount of light entering the camera thereby increasing the light sensitivity while at the same time being able to compensate for the increased opening. In such a system, the data may be decoded/inverted prior to the application of the desired colour filters in the rainbow-plane for example by deconvolving the data with an inverse filter; e.g. converting the data at the rainbow plane to the Fourier domain, and dividing these Fourier coefficients by the respective coefficients of the (projection of) coded aperture. An inverse Fourier transform then yields the deconvolved data.

It will be appreciated that that the pinhole can be replaced by a lens and/or diaphragm (and in the case one uses an invertible code, a coded aperture). In such embodiments, the lens/diaphragm are designed such that the angular range impinging on the dispersive element 205 is sufficiently small. For example, a 80 mm lens with F/16 aperture (80/16=5 mm diameter) may be used in some embodiments.

It should be noted that as is common for systems using microlens arrays, it is advantageous to perform F-number matching to ensure that the whole impinging angle range is mapped to pixels behind a single microlens. Otherwise, pixels/sensors of the image sensor 213 may receive light through multiple micro lenses which may result in unrecoverable ambiguities. For spectral imaging, the F-number of the micro lenses should preferably not match the F-number=(F/diameter) of the lens but rather match spectral range (Distance rainbow plane to micro lens/diameter of the rainbow plane). This seeks to provide a unique light path for each pixel, without overlap. On the other hand, it is desired not to have microlenses that capture a larger angle range then available, as this will result in empty space/black on the sensor. The exact configuration and dimensions of the elements of the camera may be selected to optimise the performance for the specific application.

Figure 6:
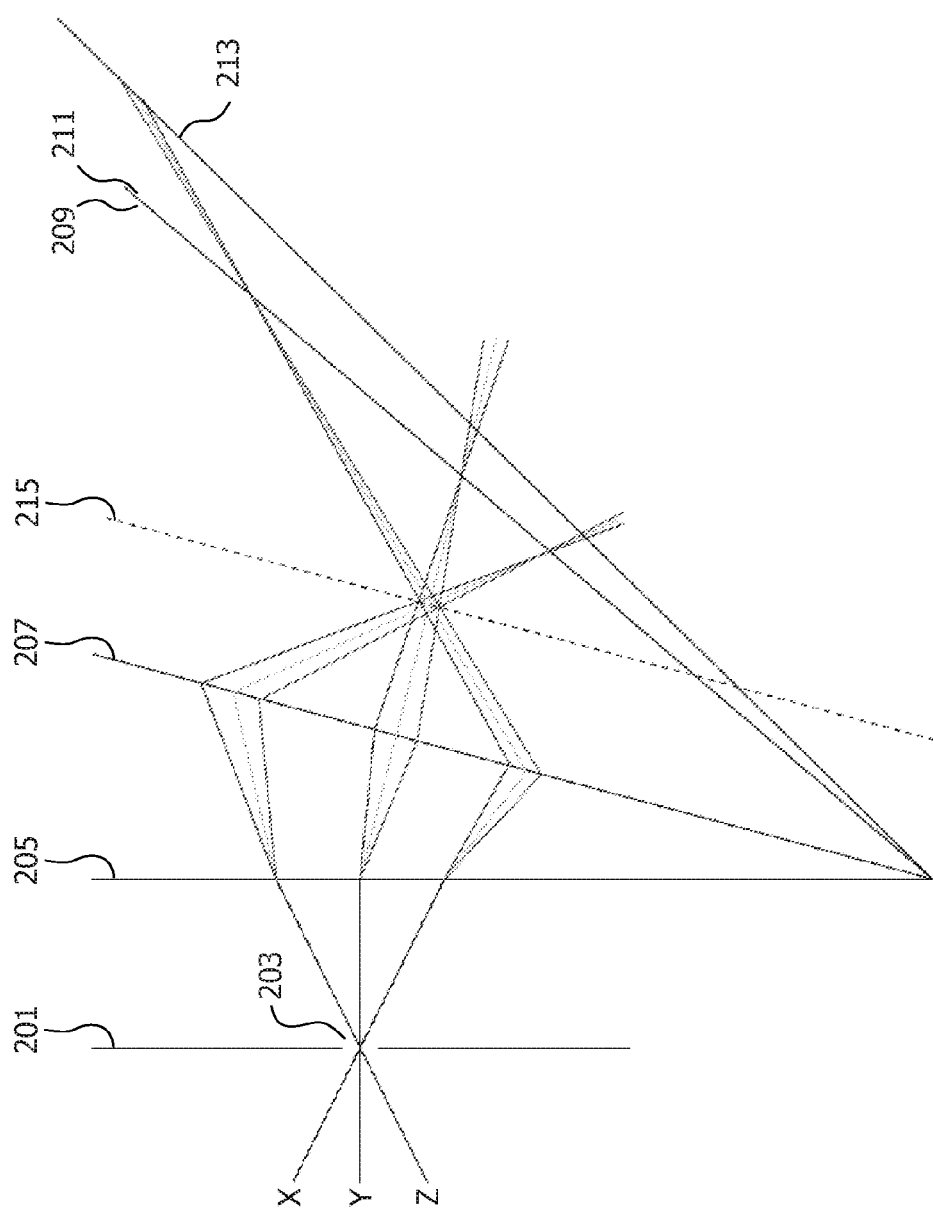
FIG. 6 is an illustration of some elements of a multi-spectral camera in accordance with some embodiments of the invention.
Figure 7:
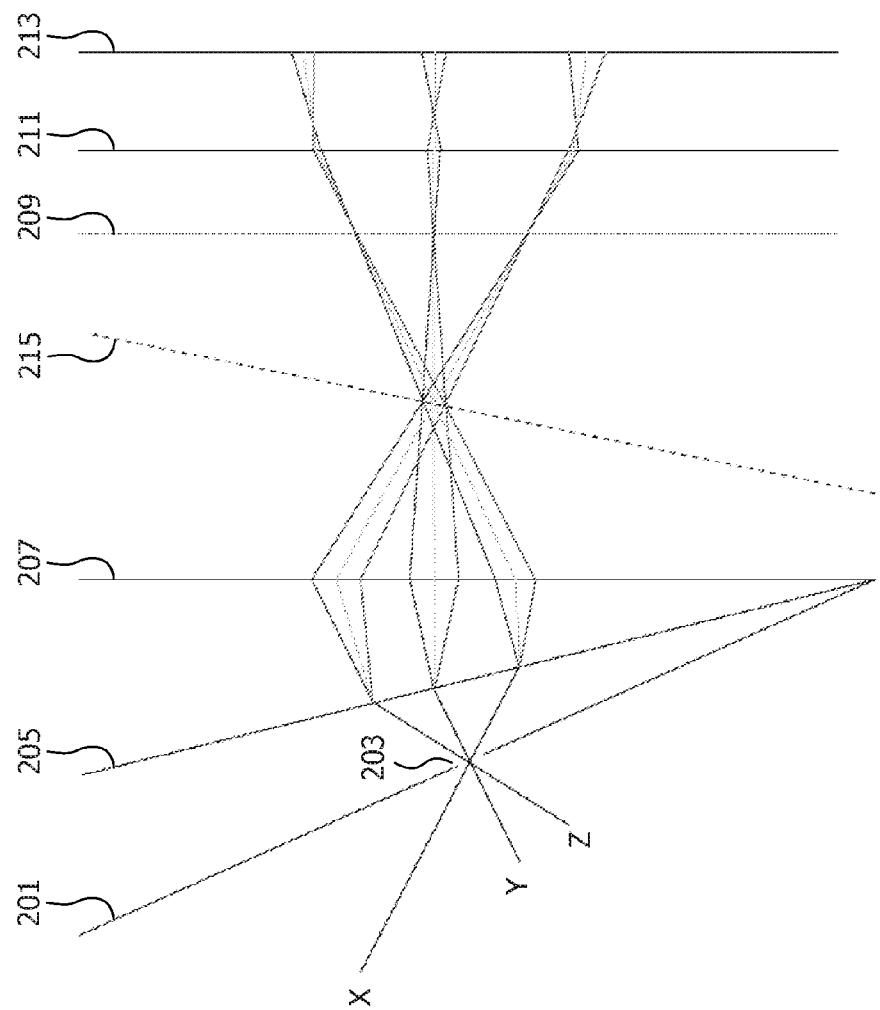
FIG. 7 is an illustration of some elements of a multi-spectral camera in accordance with some embodiments of the invention.

The above description has focussed on embodiments wherein the different planes and elements were substantially parallel. However, it will be appreciated that this is not essential and that other configurations may be used in other embodiments. Specifically, the dispersive element plane, the lens plane, the microlens array plane and the sensor planes may be arranged in a Scheimpflug configuration. Examples of such embodiments are provided in FIGS. 6 and 7. FIG. 6 illustrates an example with a flat external focus plane and an internal Scheimpflug configuration and FIG. 7 illustrates an example with an external Scheimpflug focus and a flat internal configuration.

It will be appreciated that although the structure of FIGS. 2 and 3 considers the ray spreading/propagation in a single dimension (the up/down direction of the Figures), more than one dimension may be considered in other implementations. For example, the spectrum of the incoming light may in some embodiments also be spread in a direction perpendicular to that illustrated (i.e. a similar spreading may occur in the direction into and out of the illustrated figures).

It will also be appreciated that in some embodiments, a moving camera may be used to generate a plurality of a multi-spectral images with the plurality of images being used for a subsequent analysis. For example, a plurality of multi-spectral images may be generated while the camera moves in an arc around an object being evaluated. The local spectral characteristics as well as the changes therein can then be used to analyse the object. This may e.g. be suitable for analysis of paint chip or other materials.

Indeed, the multi-spectral imaging that can be provided by the described multi-spectral camera can be used in many applications.

For example, it can be used for lighting applications where a very stringent color rendering criteria must be satisfied. E.g. multi-spectral imaging can be employed to detect and mimic daylight appearance.

As another example, the approach may be used for (local) display characterization to detect and compensate local color non-uniformities that may in arise in LED-backlit or OLED devices due to aging effects or thermal non-uniformities.

The approach may also be used in characterization applications, such as food quality detection, paint characterization, contaminant detection etc. This may also be used in the consumer field where the described approach is sufficiently compact and mechanically reliable to e.g. be built into a mobile telephone.

Also, the described approach may be used for several applications in healthcare. For example, the penetration depth of light into the skin depends on the wavelength of the light. By creating images of the skin structure as a function of wavelength, the skin can be imaged over a varying depth range. Moreover, the reflectivity spectrum of skin has a very distinct signature. This feature can be exploited to detect humans in a scene. This can be achieved by performing a cross-correlation of the local spectrum with the anticipated spectral signature to provide a human probability map. Such spectral human detection should be much more reliable than common skin tone detectors based on three broad color channels.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A multi-spectral camera comprising:
    a light blocking element having at least one hole configured to allow light from an object being imaged to pass through the light blocking element, the at least one hole having a maximum dimension wherein an angle or direction of light rays from a same spatial point of the object being imaged do not vary more than 1° across the at least one hole;
    a dispersive element for spreading light from the at least one hole in different wavelength dependent directions;
    a lens for focusing light from the dispersive element on an image plane;
    a microlens array for receiving light from the lens;
    an image sensor for receiving light from the microlens array, wherein the microlens array is located at the image plane or located in a plane between the image plane and the image sensor, further wherein the microlens array and the image sensor are arranged in different planes such that light passing through the at least one hole is distributed across a plurality of pixels of the image sensor, still further wherein an F-number of microlenses of the microlens array does not match an F-number of the lens, but matches a desired spectral range that provides a unique light path for each pixel of the image sensor, without overlap, the image sensor further for generating a pixel value signal comprising incident light values for pixels of the image sensor; and
    a processor for generating a multi-spectral image from the pixel value signal.

2. The multi-spectral camera of claim 1 wherein the multi-spectral image comprises a spectral distribution indication for pixels of the multi-spectral image.

3. The multi-spectral camera of claim 1 wherein the processor is arranged to:
  synthesize a first image at a rainbow plane from the pixel value signal;
  generating a second image by applying a spatial mask to the first image, the spatial mask corresponding to a spectral characteristic; and
  generating a spatial image for the multi-spectral image corresponding to the spectral characteristic from the second image.

4. The multi-spectral camera of claim 3 wherein the processor is arranged to:
  determine a plurality of spatial images corresponding to different spectral characteristics by applying corresponding different spatial masks to the first image; and
  generate the multi-spectral image from the plurality of spatial images.

5. The multi-spectral camera of claim 3 wherein the spectral characteristic corresponds to a bandpass filter.

6. The multi-spectral camera of claim 1 wherein the microlens array and image sensor are arranged such that light passing through the at least one hole at an identical angle is distributed across a plurality of pixels of the image sensor, the distribution being a wavelength dependent distribution.

7. The multi-spectral camera of claim 1 wherein the processor is arranged to compensate for a single pixel value of the image sensor receiving light rays corresponding to rays with different wavelengths and passing through the at least one hole at different angles.

8. The multi-spectral camera of claim 1 wherein the microlens array is substantially located at the image plane.

9. The multi-spectral camera of claim 1 wherein the microlens array is located between the image plane and the image sensor.

10. The multi-spectral camera of claim 1 further comprising a user input and a controller for adjusting a position of at least one of the microlens array and the image sensor in response to the user input.

11. The multi-spectral camera of claim 1 wherein the light blocking element provides a light blocking plane and the at least one hole is a slit in the light blocking plane.

12. The multi-spectral camera of claim 1 wherein the image sensor is a two-dimensional image sensor.

13. The multi-spectral camera of claim 1 wherein the at least one hole comprises a plurality of holes forming a coded aperture.

14. The multi-spectral camera of claim 1 wherein the at least one hole comprises a pinhole.

15. A method of generating a multi-spectral image, the method comprising:
  providing a light blocking element having at least one hole configured to allow light from an object being imaged to pass through the light blocking element, the at least one hole having a maximum dimension wherein an angle or direction of light rays from a same spatial point of the object being imaged do not vary more than 1° across the at least one hole;
  providing a dispersive element for spreading light from the at least one hole in different wavelength dependent directions;
  providing a lens for focusing light from the dispersive element on an image plane;
  providing a microlens array for receiving light from the lens;
  providing a image sensor for receiving light from the microlens array, wherein the microlens array is located at the image plane or located in a plane between the image plane and the image sensor, further wherein the microlens array and the image sensor are arranged in different planes such that light passing through the at least one hole is distributed across a plurality of pixels of the image sensor, still further wherein an F-number of microlenses of the microlens array does not match an F-number of the lens, but matches a desired spectral range that provides a unique light path for each pixel of the image sensor, without overlap, the image sensor further for generating a pixel value signal comprising incident light values for pixels of the image sensor; and
  generating a multi-spectral image from the pixel value signal.

* * * * *